US006622483B2

(12) United States Patent
Denniss

(10) Patent No.: US 6,622,483 B2
(45) Date of Patent: Sep. 23, 2003

(54) OCEAN WAVE ENERGY EXTRACTION SYSTEM AND COMPONENTS THEREOF

(75) Inventor: Tom Denniss, Randwick (AU)

(73) Assignee: Energetech Australia Pty. Limited, Randwick (AU)

( * ) Notice: Subject to any disclaimer, the term of this patent is extended or adjusted under 35 U.S.C. 154(b) by 0 days.

(21) Appl. No.: 10/032,688

(22) Filed: Dec. 28, 2001

(65) Prior Publication Data

US 2002/0066269 A1 Jun. 6, 2002

Related U.S. Application Data

(62) Division of application No. 09/308,148, filed as application No. PCT/AU97/00758 on Nov. 10, 1997, now Pat. No. 6,360,534.

(30) Foreign Application Priority Data

Nov. 14, 1996 (AU) .............................. PO 3613

(51) Int. Cl.[7] .................................. E02B 9/08
(52) U.S. Cl. ......................................... 60/398
(58) Field of Search ............................ 60/398; 415/3.1, 415/4.2, 4.4, 906, 907; 416/223 R

(56) References Cited

U.S. PATENT DOCUMENTS

| 3,964,839 | A |   | 6/1976  | Kusiak ..................... 416/160 |
| 4,078,382 | A |   | 3/1978  | Ricafranca et al. ........... 60/398 |
| 4,221,538 | A |   | 9/1980  | Wells .......................... 415/2 |
| 4,286,347 | A |   | 9/1981  | Modisette ....................... 9/8 |
| 4,313,711 | A | * | 2/1982  | Lee ......................... 416/223 R |
| 4,545,726 | A |   | 10/1985 | Holliger ....................... 415/26 |
| 5,005,357 | A | * | 4/1991  | Fox ............................ 60/398 |
| 6,360,534 | B1 | * | 3/2002  | Denniss ....................... 60/398 |

FOREIGN PATENT DOCUMENTS

| CH | 660 770    | 6/1987 | ............ F01D/1/02 |
| JP | 57-5567 A  | 1/1982 |                        |
| WO | WO 84/01177 | 3/1984 |                        |

OTHER PUBLICATIONS

Supplementary European Search Report for EP 97 91 1054, dated Dec. 28, 1999.
Indiresan, P. V. et al., "Generating Electrical Power From Wave Energy The Indian Experiment," Proceedings of the Intersociety Energy Conversion Engineering Conference. (IECEC), US New York, vol. IEEE CONF.24, p. 2121–2126 (1989).
New Scientist vol. 156, No. 2106, Nov. 1, 1997; p. 6 article titled "Bay Wash" by Bill Clayton.
Derwent Abstract Accession No. 88–298784, Q55, SU 1386736 A (Buryachok) Apr. 7, 1988.

* cited by examiner

Primary Examiner—Edward K. Look
Assistant Examiner—Thomas E. Lazo
(74) Attorney, Agent, or Firm—Marshall, Gerstein & Borun

(57) ABSTRACT

The invention relates to wave powered energy extraction systems and the components thereof, in which the oscillating ocean wave motion is used to displace a volume of air to drive a wind operated turbine connected to an electrical generator. The various aspects of the invention include: a parabolic or part parabolic wave focusing device (1); an air compression chamber arrangement particularly suited for use with the wave focusing device; a wind turbine operable to rotate unidirectionally under periodically reversing air flow conditions of the kind contemplated above.

14 Claims, 8 Drawing Sheets

OCEAN WAVE ENERGY EXTRACTION SYSTEM AND COMPONENTS THEREOF

This is a divisional of U.S. application Ser. No. 09/308,148, filed Jul. 2, 1999, now U.S. Pat. No. 6,360,534 which is a 371 of PCT/AU97/00758 filed Nov. 10, 1997.

FIELD OF THE INVENTION

The present invention relates in general to systems for harnessing and converting the energy from ocean waves to more useable energy forms such as electric power.

More particularly, the invention relates to wave powered energy extraction systems and the components thereof, in which the oscillating ocean wave motion is used to displace a volume of air to drive a wind operated turbine connected to an electrical generator. In the preferred form of the invention, the waves are directed into a specially configured air compression chamber, in the outlet of which is arranged a suitably operable wind turbine.

To this end the various aspects of the invention include: a novel wave focusing device; an air compression chamber arrangement particularly suited for use with the novel wave focusing device; and an independently novel wind turbine operable to rotate unidirectionally under periodically reversing air flow conditions of the kind contemplated above.

It will be appreciated that whilst the various aspects of the invention are described herein as forming in combination a complete energy conversion system, each of these components, and in particular the turbine, may be suited to use in other unrelated applications. Alternatively, they may each be incorporated into similar energy conversion systems when combined with new or existing alternative component devices which are not described in detail in this document.

BACKGROUND OF TEE INVENTION

Concerns regarding the limited resources of traditional combustible hydrocarbon fuel sources and the damaging emissions resulting from their use, has prompted considerable research into sustainable non-polluting energy sources such as waves, wind, tidal, geothermal and solar.

Whist significant technological advances have been made in the conversion of energy from some of these alternative areas such as wind and solar, the majority of wave powered generation systems proposed to date have not been physically practical and/or economically viable.

In this regard, numerous different types of wave powered generation systems have been proposed, most of which are founded on the basic principle of using the vertical motion inherent in the movement of waves to effect a corresponding displacement of a component of the generating system. However, all of the systems proposed so far have had their limitations.

For example, one such system utilises oscillating floating paddles, the motion of which is converted directly or indirectly to electrical power. However, these floating paddle systems generally have a low energy conversion efficiency and are unable to withstand adverse weather conditions. This means either that such systems are limited to coastal locations having only moderate and predictable wave patterns, or that the systems must be removed to a suitable shelter when storms are expected.

Other systems include those based on the concept of channelling the waves through water displacement pumps, or alternatively into large accumulators or reservoirs, the hydrostatic pressure of the stored water subsequently being used to drive a turbine generator or the like. Again, the overall energy conversion efficiency is relatively low given the associated capital costs.

One of the most promising alternative types of systems proposed so far, on which the present invention is based, are those in which the vertical movement of the waves is translated to rotary movement to directly or indirectly drive a generator. In these systems the rising and falling sea water is channelled toward and harnessed within an air compression chamber. The chamber has at its exit an outlet duct or venturi, in which is located a wind turbine of a kind operable to rotate unidirectionally under the periodically oscillating air flows induced by the wave motion.

Again, the main deficiencies with these latter wave driven air turbine systems, is the restricted overall achievable energy efficiencies. This is due primarily to the limitations firstly in the means of focusing the wave energy to maximise the wave displacement amplitude, and secondly in the operating efficiencies inherent in the turbine design.

In the first case, most of the prior art wave focusing devices have relied on planar reflection of the wave front and/or channelling of the wave front through a narrowed opening such that the vertical displacement or amplitude of the wave is magnified. Others include various means to alter the formation of the sea bed to controllably disrupt the wave propagation, so as to thereby maximise the wave amplitude at a predetermined location. Once again these types of systems have been limited so far in respect of the maximum achievable wave amplification for a given level of capital expenditure.

In the second case most prior art turbines are designed for constant velocity rotation in response to fluid flow in one direction only, and as such are unable to operate continuously in response to the reversing fluid flow conditions present in wave powered applications of the kind discussed above. However, a number of specially configured unidirectional turbines have been designed for these reversing flow conditions, the most commonly used devices being based on what is known as the "Wells" turbine.

The original Wells turbine was of a monoplane axial fan type structure having radially extending blades of an aerofoil section that are generally symmetrical about the chord line, where the blades are fixed with their planes of zero lift normal to the axis of the rotor.

However, these early turbines were known to suffer from stalling, often resulting in the shut down of the wave energy harnessing plant. This stalling occurs due to the fact that such a turbine needs to be designed around anticipated levels of air flow, whereas the size of the waves entering the turbine chamber cannot be controlled for all occasions. Therefore, when a larger sized wave enters the chamber, its momentum causes a correspondingly greater air flow rate through the turbine blades. As the rate of rotation of the blades is unable, with its blade configuration, to increase correspondingly to counter this increased airflow, the angle of attack of the airflow to the blades increases beyond the stalling angle and the turbine shuts down.

Some later prior art devices have attempted to overcome this problem by effectively installing two monoplane Wells turbines in series resulting in a bi-plane turbine. While this modified system solves the stalling problem, it does so at a penalty to the overall efficiency. This is because it sacrifices the first set of blades by allowing them to correspondingly stall and shut down, the second set of blades then continuing operation at a reduced pace and efficiency. This is due to the total air flow rate having now been decreased and smoothed out by the stalling and interruption of the air flow by the first turbine.

These prior art turbines also usually rely on a low revving high mass construction in order to ensure smooth continuous rotation under periodically reversing driving air flows of the kind contemplated.

It will therefore be-appreciated that most prior art turbines suited to this type of application are often quite complex in design and usually have severe limitations in relation to operating conditions and/or efficiencies.

It is an object of the present invention to provide a wave energy extracting system and/or one or more of the components thereof, which overcomes or at least ameliorates one or more of the above discussed disadvantages of the prior art, or at least offers a useful alternative thereto.

DISCLOSURE OF THE INVENTION

According to a first aspect of the invention there is provided a plane wave focusing and amplifying structure, said structure comprising an open sided bay bounded by a generally upright wall, the wall being configured at its inner periphery to define in plan section from the bay opening two converging arms of generally part parabolic curvature, wherein the axes of symmetry of each said paraboli from which the arms are derived are parallel and the arms are joined adjacent their converging ends to form a shared apex, said wall being oriented to admit an advancing wave front in a direction generally parallel to said axes of symmetry, so that upon reflection from the wall the wave converges to an energy harnessing region near the apex at or adjacent the focus of each of said paraboli, thereby amplifying the vertical displacement of the wave at that region.

Desirably, the converging arms of part parabolic curvature are joined at the shared apex by means of an end wall portion that also defines the rear wall portion of an air compression chamber, the front portion of the chamber preferably being defined by a front wall section that extends forward of the rear portion to circumscribe a predetermined area around the energy harnessing region, the front wall section extending only partially below the anticipated water level so that the water is able to flow below the front wall and up into the chamber.

In a preferred form the wall is configured to define in plan section at its inner periphery an end part of a single parabola or close approximation thereto, wherein upon reflection from the wall the waves converge in a region at or adjacent the single focus of that parabola.

In another form, that may be less costly to construct, the structure comprises an air compression chamber wherein the rear wall portion maybe formed in part by the existing coast line and the bay is defined simply by two possibly relatively short arms of part parabolic curvature extending from the chamber walls. Generally, any compromise on the length of the parabolically curved arms is compensated for by extending the plan area of the air compression chamber that circumscribes the energy harnessing region.

Preferably, the bay is further bounded at its base by a generally planar sea bed that is of constant depth along a direction generally perpendicular to the axis of symmetry of the parabola. The depth and inclination (if any) of the sea bed can vary according to local strata and wave conditions, as well as the manner in which the amplified waves are to be harnessed for energy extraction. The general aim will be to optimise local conditions to maximise the wave magnification, ideally without the waves breaking prior to entering the harnessing region. For example, in one preferred form, the sea bed may slope upwardly toward the harnessing region to assist in further forcing the water upwardly at that location.

Preferably, the focal length of the parabola should be less than or equal to $1/7$ of a wave length of the incoming waves, which in a majority of cases results in a focal length of between 5 and 15 meters.

According to a second aspect of the invention there is provided a turbine operable to rotate unidirectionally when subjected to reversing generally axial fluid flows therethrough, said turbine included a rotor comprising:
a central hub;
a plurality of straight radially extending aerofoil sectioned blades each connected with said hub;
the cross section of each of said blades being approximately symmetrical about a line defining the maximum camber height and generally constant along its radially extending length;
whereby the approximately symmetrical shape of the blades and their orientation in relation to the hub facilitates unidirectional rotation of the rotor in response to reversing axial fluid flows therethrough.

Preferably the blades are each connected with the hub such that the included angle between the chordal plane of said aerofoil section and the axis of the hub is between 0° and 90° and more preferably between 0° and, say, 45°.

Desirably, the above discussed maximum included angle is adjustable and further can preferably be reversed in synchronisation with the reversing fluid flow, to thereby optimise the angle of attack for the fluid flow in both directions.

It will be appreciated that reversing of the blade pitch can be achieved in numerous ways including, for example, the use of a motor driven bevel gear assembly disposed to rotate a central spigot on which each blade is mounted. In another variation, each blade is mounted on a spigot having an offset operating arm which cooperates with a helically splined actuating shaft which is reciprocally movable along the axis of the rotor.

In one preferred form suited to a particular set of conditions, the maximum included angle is between +30 and −30 and is reversible to correspond with the reversing fluid flow. In another preferred form, particularly suited for applications of the kind described herein, in which the working fluid is a gas such as air, the reversal of the blade pitching is by means responsive to a pressure transducer disposed to detect the point of reversal of the gas flow.

Desirably, the blades are equi spaced about the central hub. In some preferred forms suited to particular applications, the rotor has between 4 and 16 blades. The solidity can be highly variable often falling in the range of between 0.2 and 0.8. The preferred blade chord ratio is 18%, and the preferred blade profile comprises two merged front halves of a standard NACA 65-418 aerofoil.

According to a third aspect of the invention there is provided an ocean wave energy extracting system, said system including:
wave focusing means to magnify the periodic vertical peak to trough displacement of incoming waves at a predetermined plan location defining an energy harnessing region;
an air compression chamber having a generally submerged water inlet disposed at or closely adjacent said harnessing region to admit the periodically oscillating waves so as to displace a volume of air thereabove to thereby generate a correspondingly periodic reversing air flow;
said compression chamber also having an air outlet in which is located an air driven turbine operable to rotate unidirectionally in response to said reversing air flow.

Desirably, the turbine is one configured in accordance with the second aspect of the invention.

Preferably, the wave focusing means comprises a generally parabolic plane wave focusing and amplifying structure in accordance with the first aspect of the invention wherein the focus of the parabola falls within the predetermined plan location.

Desirably, the air compression chamber is configured to converge from the water inlet toward the air outlet so as to accelerate the air flow. In one preferred form, the chamber includes a venturi adjacent its outlet in the throat of which is disposed the air driven turbine.

In other preferred forms, the air compression chamber outlet and/or the shrouding and/or stators associated with the turbine, may include guide vanes to optimise the direction of air flow into and/or out of the turbine.

BRIEF DESCRIPTION OF THE DRAWINGS

Preferred embodiments of the invention will now be described, by way of example only, with reference to the accompanying drawings, in which.

PREFERRED EMBODIMENTS OF THE INVENTION

Figure 1:
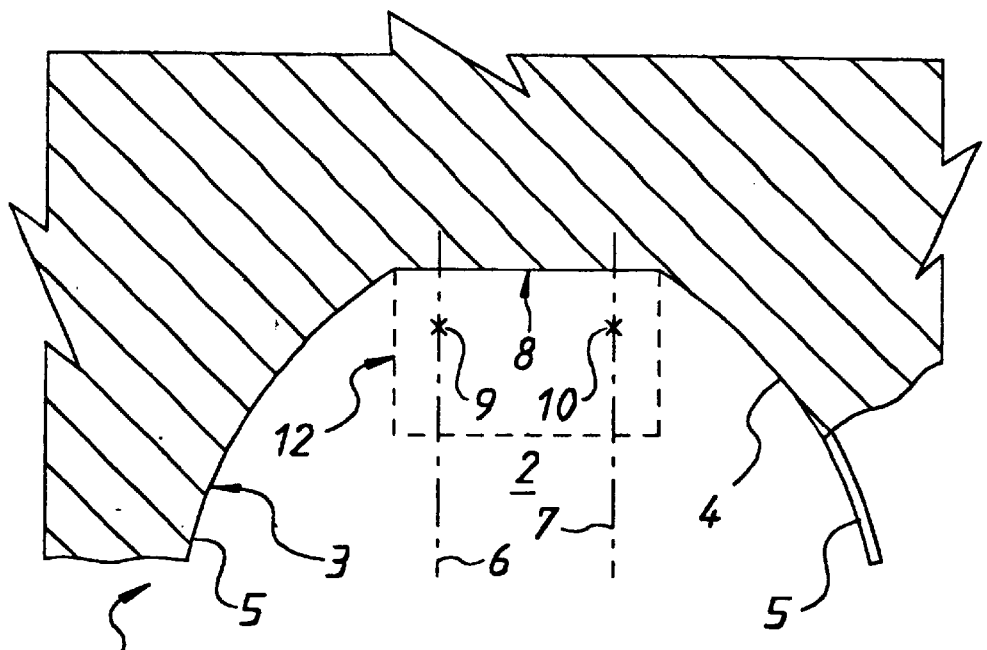
FIG. 1 is a schematic plan view of a first embodiment wave focusing and amplifying structure in accordance with a first aspect of the invention wherein the wall arms from the bay opening are formed by two part parabolic sections having parallel and spaced apart axes of symmetry.

Referring firstly to FIG. 1, there is shown a first embodiment wave focusing structure in accordance with the first aspect of the invention denoted generally by reference numeral 1.

The structure 1 comprises an open sided bay 2 bounded by a generally upright sea wall 3. The wall 3 is concavely curved at its inner periphery 4 to define in plan two converging arms 5 of generally part parabolic curvature, wherein the respective axes of symmetry 6 and 7 of the paraboli from which the arms are derived are parallel. The arms 5 are joined adjacent their converging ends to form a shared apex 8. The wall 3 is oriented to admit an advancing wave front that is propagating in a direction generally parallel to the axes of symmetry 6 and 7.

Figure 5:
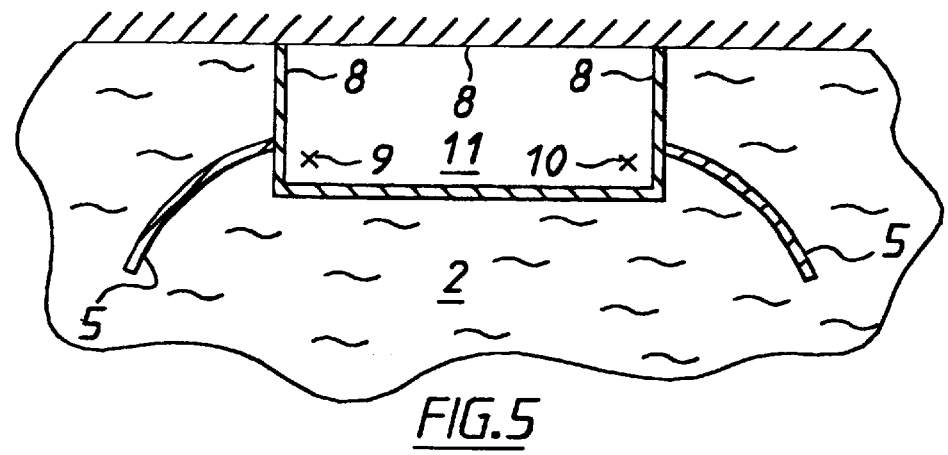
FIG. 5 is a schematic sectional plan view of a third embodiment plane wave part parabolic wave focusing and amplifying structure.

FIG. 5 shows another variation on the structure illustrated in FIG. 1 which may be employed when it is too costly or not possible to construct the wall of the bay as either part of the surrounding coastline or having long parabolic arms extending out into the bay. In this instance a compromise is reached by constructing relatively short part parabolic arms 5 which connect directly to a shared apex 8 which simultaneously forms the rear wall portions of an associated air compression chamber shown in plan section at 11.

Figure 4:
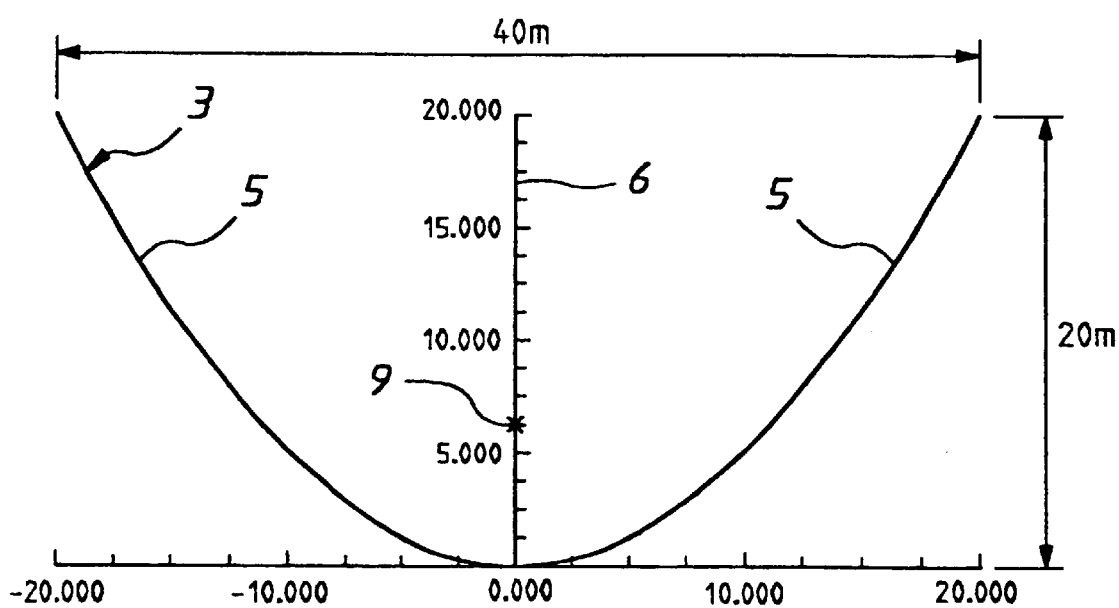
FIG. 4 is a graphical scaled representation of the second embodiment plane wave parabolic wave focuser as shown in FIGS. 2 and 3.
Figure 2:
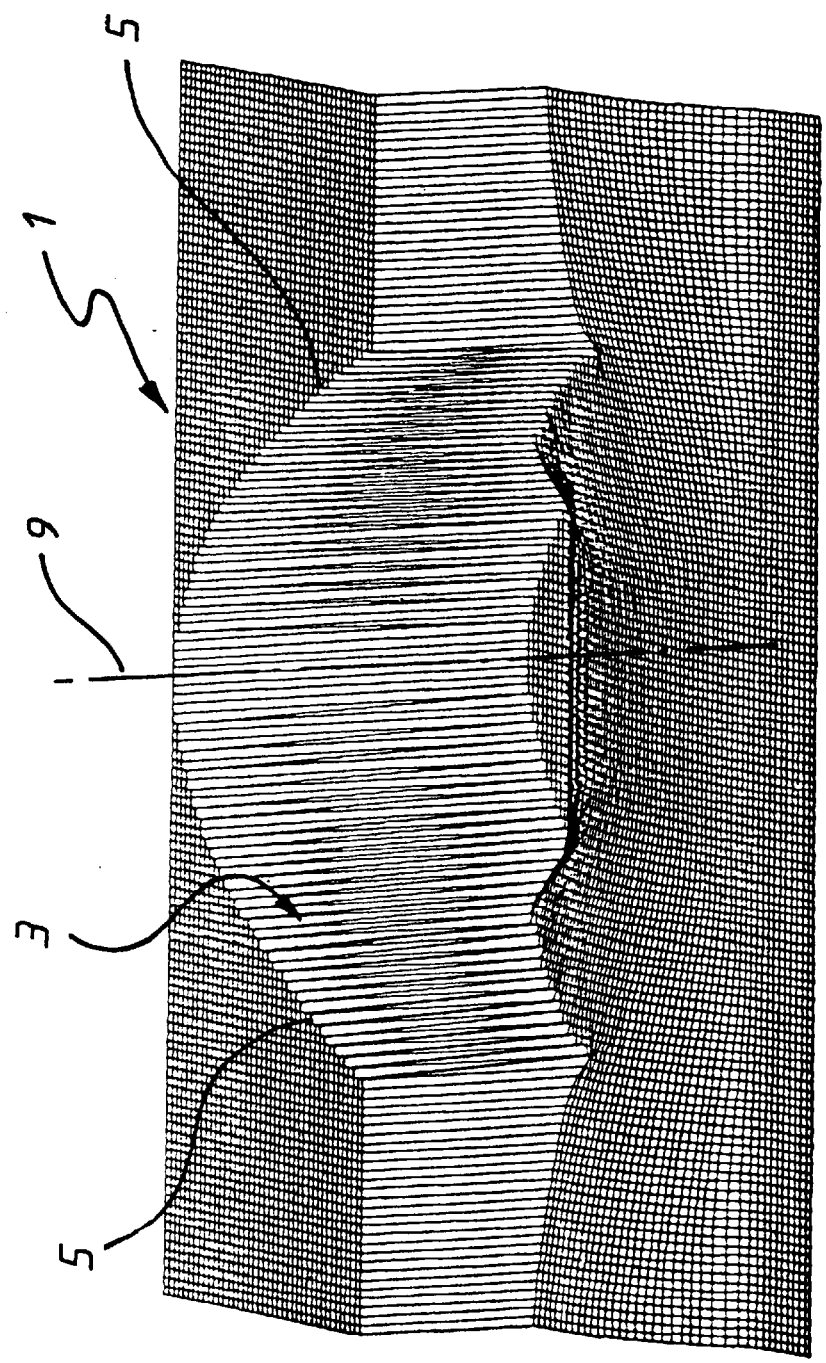
FIG. 2 is a schematic computer generated perspective view of a second embodiment plane wave focusing and amplifying structure in accordance with the first aspect of the invention wherein the wall is defined generally by an end portion of a single parabola, illustrating the maximum wave trough displacement achievable at the harnessing region.
Figure 3:
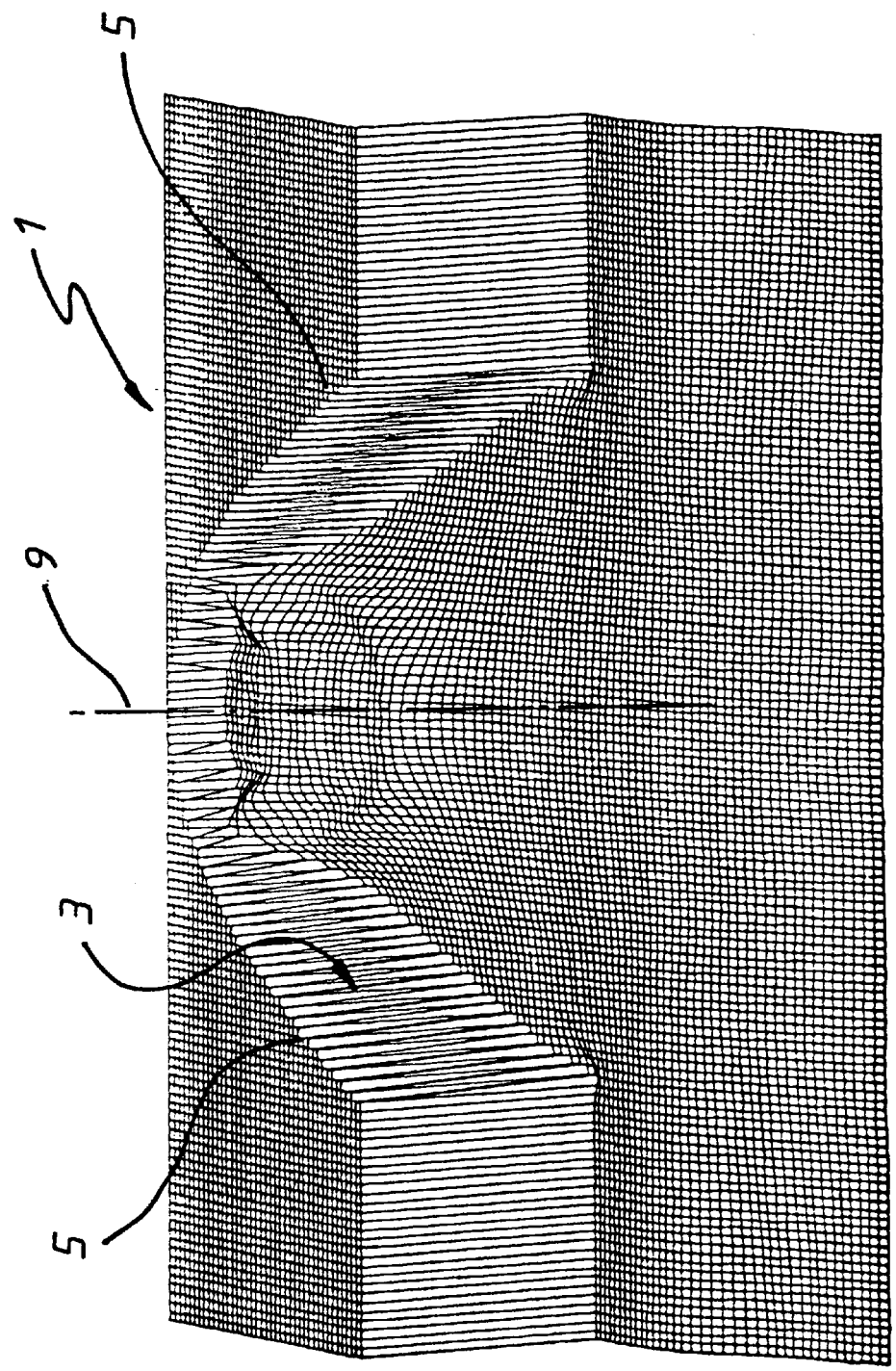
FIG. 3 is a schematic computer generated perspective view of the structure shown in FIG. 2, illustrating the maximum wave peak displacement achievable at the energy harnessing region.

FIGS. 2, 3 and 4 show a preferred form where the structure is formed as an end portion of a single parabola or close approximation thereto having a single focus 9.

Waves in the ocean contain enormous amounts of energy, but since they are generally plane waves, the energy in each crest is spread out along that crest. The aim of the parabolic or part parabolic wave focusing and amplifying structure of the first aspect of the invention, is to transport or converge that energy to one centralised region from which that energy can be more readily harnessed.

In use, the wave focusing structure is orientated as described, such that the plane wave advances toward the parabolic or part parabolic wall 3 in a direction generally parallel to the axis (or axes) of symmetry 6 and 7. On impact with the parabolic sections 5 of the wall 3, the wave is reflected to converge toward the corresponding focus 9 or foci 9 and 10 of each respective parabola. When the wall defines part of a single parabola as in the preferred second embodiment shown in FIGS. 2, 3 and 4, the wave converges toward the single focus 9 as a circular or polar wave. At this point, the displacement amplitude of the wave will have been significantly magnified, making it the perfect plan location at which to position suitable means for converting that sea water displacement to another more useable energy form. This is defined as the energy harnessing region shown generally at 12 which in FIG. 5 corresponds in location with air compression chamber 11. It will be appreciated that the plan size of this region is not fixed and its determination will depend in part on the achieved energy spread within this area.

It should be noted that there are a few conditions which need to be met so as to achieve maximal energy focusing with the generally parabolic or part parabolic wave focusing and amplifying structure described above.

Firstly, the wave crests should ideally be propagating closely parallel to the or each parabola's axis of symmetry 6 and 7. It appears slight variations can be tolerated with little loss of energy, but the greater the angle between the axis or axes of symmetry and the wave propagation direction, the more spread out will be the area of energy concentration making the system less efficient. This is not generally a major concern providing the wave focusing structure is correctly oriented at installation, as waves at the coast do not vary their angle of incidence greatly due to the approach bathometry.

Once the section of the plane wave enters the domain of the parabola, the sea bottom should ideally be reasonably flat or planar across the axis of the parabola or paraboli, so as not to disturb the wave direction, and of sufficient depth or otherwise configured to prevent the wave crests from breaking prior to entering the harnessing region as they grow due to non-linear effects. Preliminary investigations have indicated that for one particular application a depth at the bay opening of approximately 6 meters should be sufficient in most but the biggest of surf conditions.

If the energy is initially scattered due to a very choppy and irregular incoming wave, then some energy will be scattered away from the focus or foci 9 and 10. The loss of energy due to this or to any of the above-mentioned conditions can be lessened by choosing the focal length appropriately, so that the waves do not have time or the space in which to vary greatly within the parabolic domain. Once again preliminary investigations have indicated that a focal length of roughly $1/7$ of wave length should be suitable in a wide variety of applications. As wave lengths are typically 35 to 105 meters, this translates to a focal length of about 5 to 15 meters.

The potential of a wave focusing device of this kind is significant, computer simulations indicating that 24% more energy flows into the parabolic domain than exists in a non focused wave of a length corresponding to the opening width of the parabola This translates to a wave magnification of the order of 3. Tests to date have shown that a magnification factor of 2.5 is readily achievable.

However, it is appreciated that in reality there will be losses that will prevent the maximum theoretical energy levels from being obtained. For example, in practical operation of the single parabola structure, the circular wave which converges on the focus will not, in fact, be a full circle, as there will be a missing sector on the open ocean side. At the edges of this missing sector there will be some diffraction of energy into the domain of the parabola. There may also be losses due to interfering wave reflection from coastal structures located adjacent the parabolic bay and irregularities in the sea bed.

Preferred means of achieving that energy extraction and conversion will be described hereinafter with reference to the second and third aspects of the invention and FIGS. 6 to 14 relating thereto.

Figure 6:
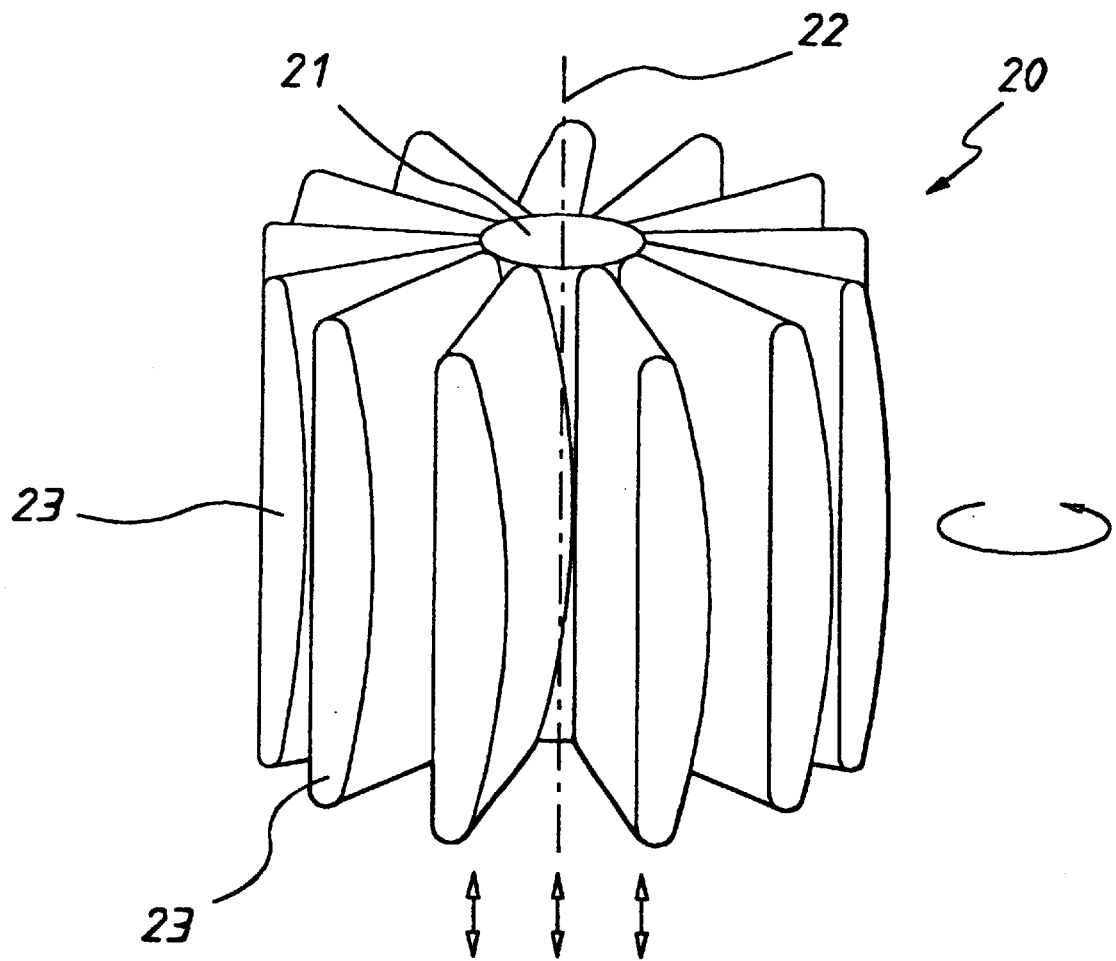
FIG. 6 is a schematic perspective view of a first embodiment turbine rotor in accordance with a second aspect of the invention, wherein the blades are fixed at an included angle of 0° to the axis of the central hub.

Turning to FIG. 6, there is shown a rotor 20 of a first embodiment turbine in accordance with the second aspect of the invention operable to rotate unidirectionally when subjected to reversing generally axial fluid flows therethrough.

The rotor 20 includes a central hub 21 having an axis 22 extending from which are a plurality of straight radially extending aerofoil sectioned blades 23.

Figure 9:
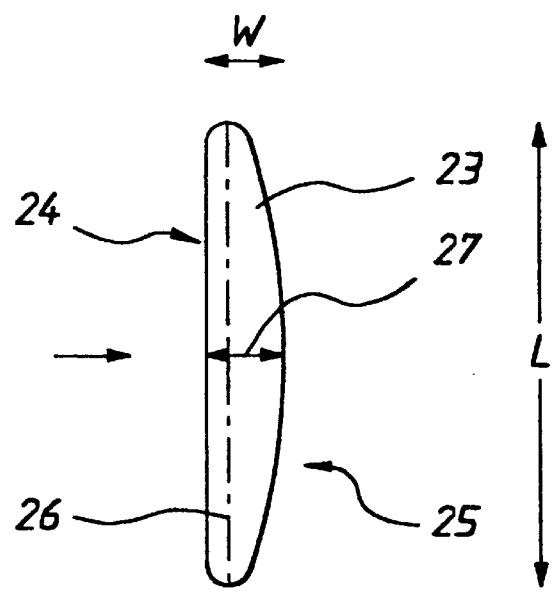
FIG. 9 is a schematic transverse section of one blade of the turbine rotors shown in FIGS. 6, 7 and 8.

Desirably, the blades 23 have an aerofoil section of the general configuration illustrated in FIG. 9 having on one side a generally planar surface 24 and on the opposing side a generally convex surface 25. The chord line, which also denotes what will be referred to as the longitudinally extended chordal plane of the blades, is shown generally at 26. As shown, the cross-section of each of the blades is also approximately symmetrical about a line 27 defining the maximum camber height of the blade section and is also generally constant along its radially extending length.

The first embodiment illustrated in FIG. 6 has the chordal plane of each of the blades straightly aligned with or parallel to the central hub axis 22, that is at an included angle of 0°. In this manner, air flow entering the turbine from either axial direction will have the same angle of incidence with the rotor blades 23 and effect the same resultant rotation of the rotor as marked. In this regard, the net force exerted in each flow direction on the generally planar blade surface 24 as the fluid flows by, due to the Bernoulli effect and the resultant pressure difference between the planar and convex sides of the blades, will be in the same direction, the magnitude depending on the relative air flows in the two opposing directions.

Whilst this fixed blade configuration may be satisfactory for various low speed applications, as the speed of rotation of the rotor increases, the angle of attack of the driving flow will no longer be optimal, thus effecting the operational efficiency of the turbine.

Figure 7:
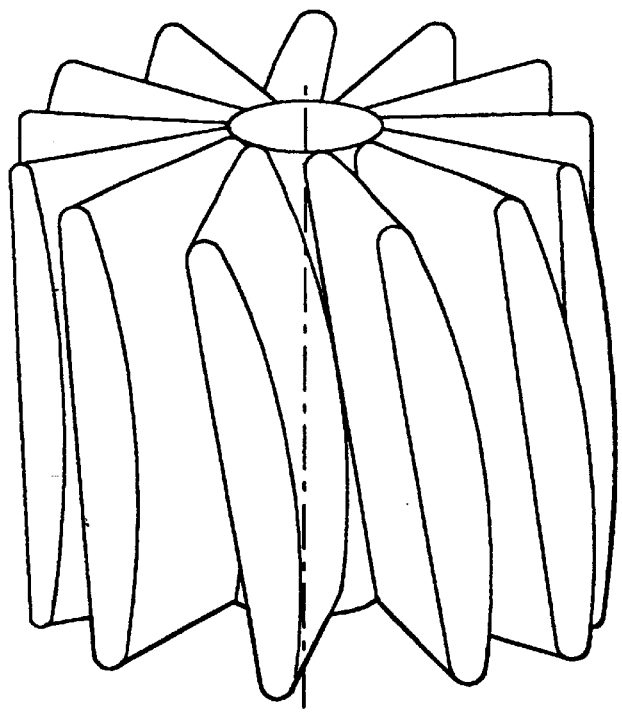
FIG. 7 is a schematic perspective view of a second embodiment turbine rotor in accordance with the second aspect of the invention, wherein the blade pitch is adjustable and can be reversed in response to the reciprocating air flow through the turbine.
Figure 8:
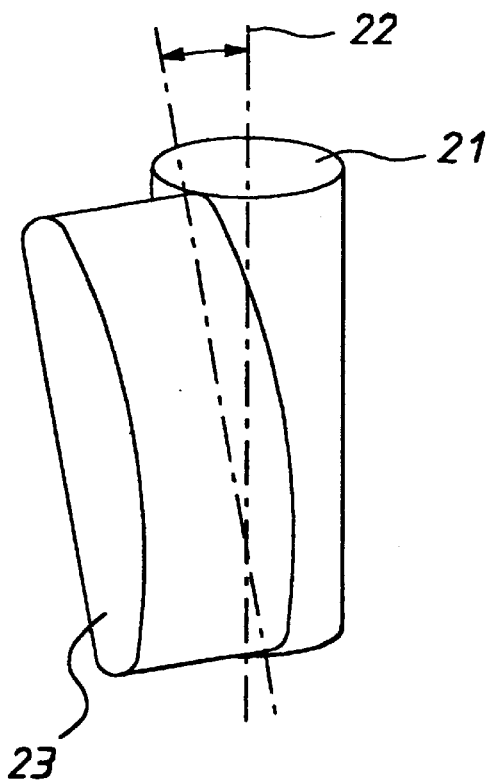
FIG. 8 is a part view of the turbine rotor FIG. 7 showing one blade and its connection to the hub.

In order to address this problem, a second variable pitch embodiment of the invention has been proposed as illustrated in FIGS. 7 and 8. In this embodiment, each of the blades 23 are connected to the central hub 21 by means of a central spigot 28 or the like which, by means of some appropriate internal mechanism, facilitates rotation of the blade to thereby vary its pitch.

It should be noted that the mechanism for adjusting the blade pitch is preferably configured such that the pitch can be automatically reversed in synchronisation with the reversing fluid flow through the rotor, so that the angle of attack is optimised in both directions. Clearly, if the rotor is fixed for optimisation in one direction only, the detrimental effect when the air flow is reversed would in most situations more than off set any benefits that could potentially be gained over the fixed parallel blade configuration shown in FIG. 4.

Figure 10:
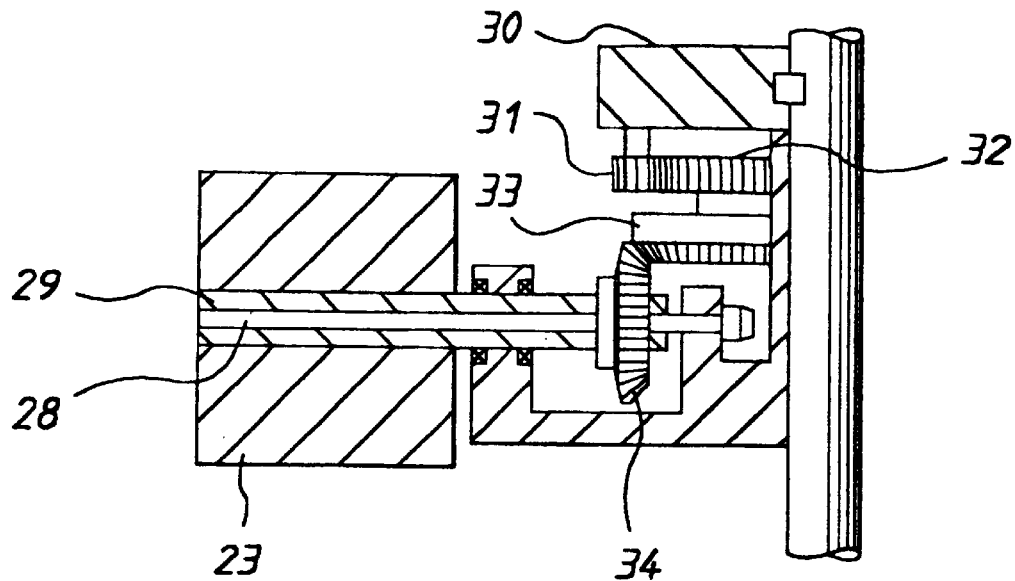
FIG. 10 is a schematic sectional view showing a first embodiment turbine blade pitch variation and reversal mechanism.
Figure 11:
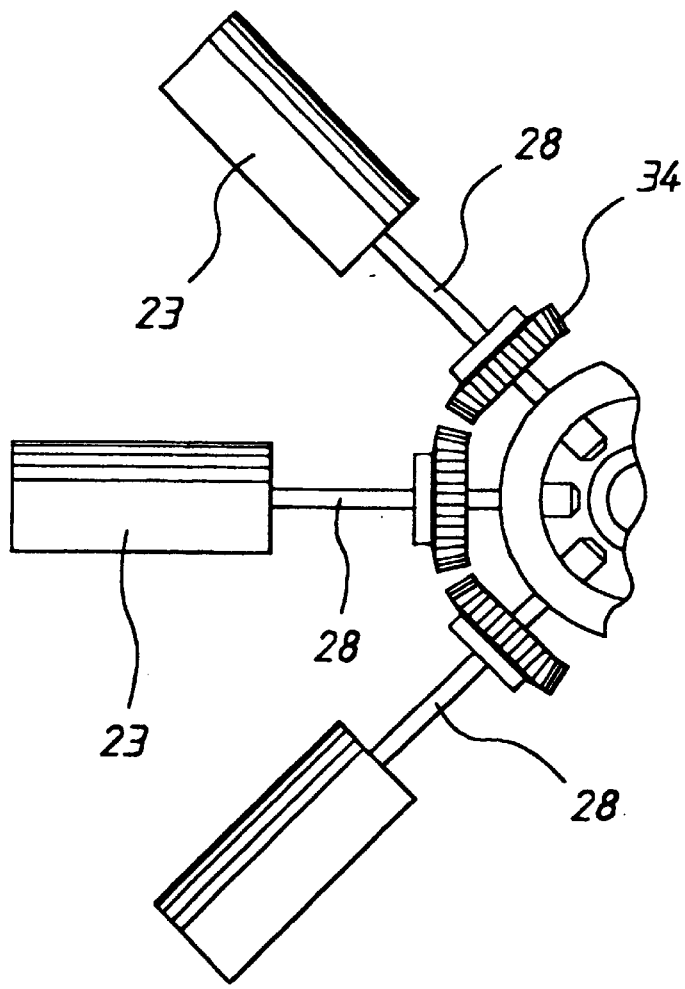
FIG. 11 is a part plan view of the mechanism shown in FIG. 10.

Two suitable mechanisms are illustrated, by way of example only, in FIGS. 10 to 13. In this regard, FIGS. 10 and 11 show a simple arrangement whereby each blade 23 is secured by means of a sleeve 29 to a centrally located spigot 28, which in turn is rigidly connected to the rotor hub 21. Also rigidly connected to the hub 21 is a suitable motor 30 which drives an axially depending pinion gear 31. The pinion engages a spur gear 32 which has an associated annular bevel gear 33 which is able to rotate freely around the central hub 21.

The sleeve 29 of the central spigot 28 of the blade 23 has at its end a smaller bevel gear 34 which engages the annular bevel gear 33. A similar arrangement is provided for each blade. In this manner it is possible while the turbine is rotating at high speed, to vary the inclination of the blades relative to the axis of the rotor by means of the gear mechanism described.

Figure 12:
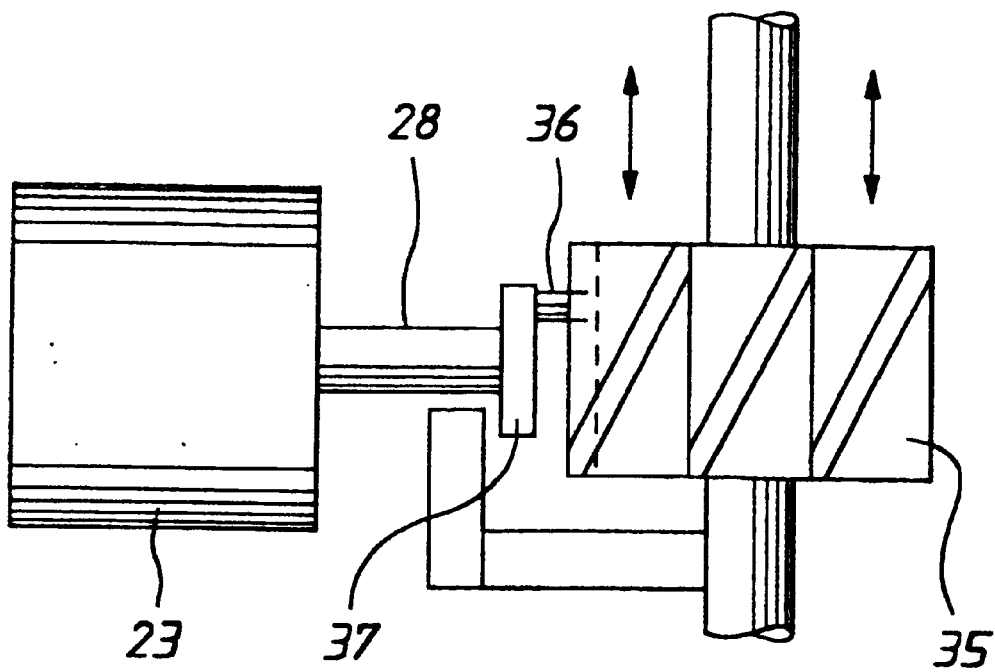
FIG. 12 is a schematic view showing a second embodiment turbine blade pitch variation and reversal mechanism.
Figure 13:
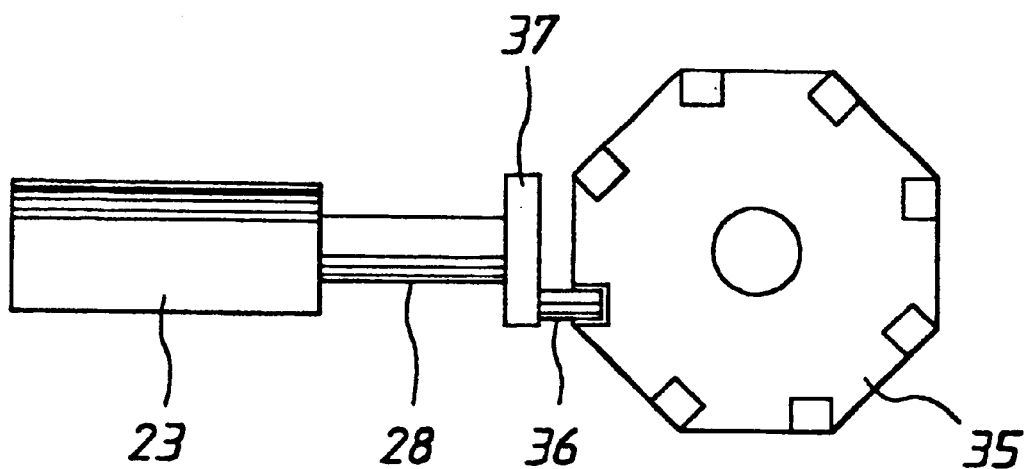
FIG. 13 is a part plan view of the mechanism shown in FIG. 12.

FIGS. 12 and 13 illustrate an alternative arrangement whereby axial rotation of the blades 23 is effected by axial reciprocal movement of a diagonally splined actuating collar 35. The collar splines engage pins 36 mounted on offset actuating arms 37, causing the blades to thereby rotate about the central spigot 28.

It will be appreciated by those skilled in the art of turbine design, that there are a number of parameters which need to be evaluated for the particular conditions and energy content of each proposed application for a turbine of this type. These parameters include the aspect ratio of the blades (chord ratio), the chord length of the blade, the solidity of the turbine (effectively a blade length to hub diameter ratio), the number of blades, and the maximum angle through which the blades can turn to the air flow (ie. the blade pitch). One example that has been proposed as suitable to one particular application has a blade chord ratio of 18%, a chord length of 0.4 m, a hub diameter 1.2 meters, a blade length of 0.45 m, a total of 12 blades and a maximum included angle between the chordal plane of the blades and the hub axis of 30°. The preferred blade profile comprises two merged front half portions of a standard NACA 65-418 aerofoil.

Figure 14:
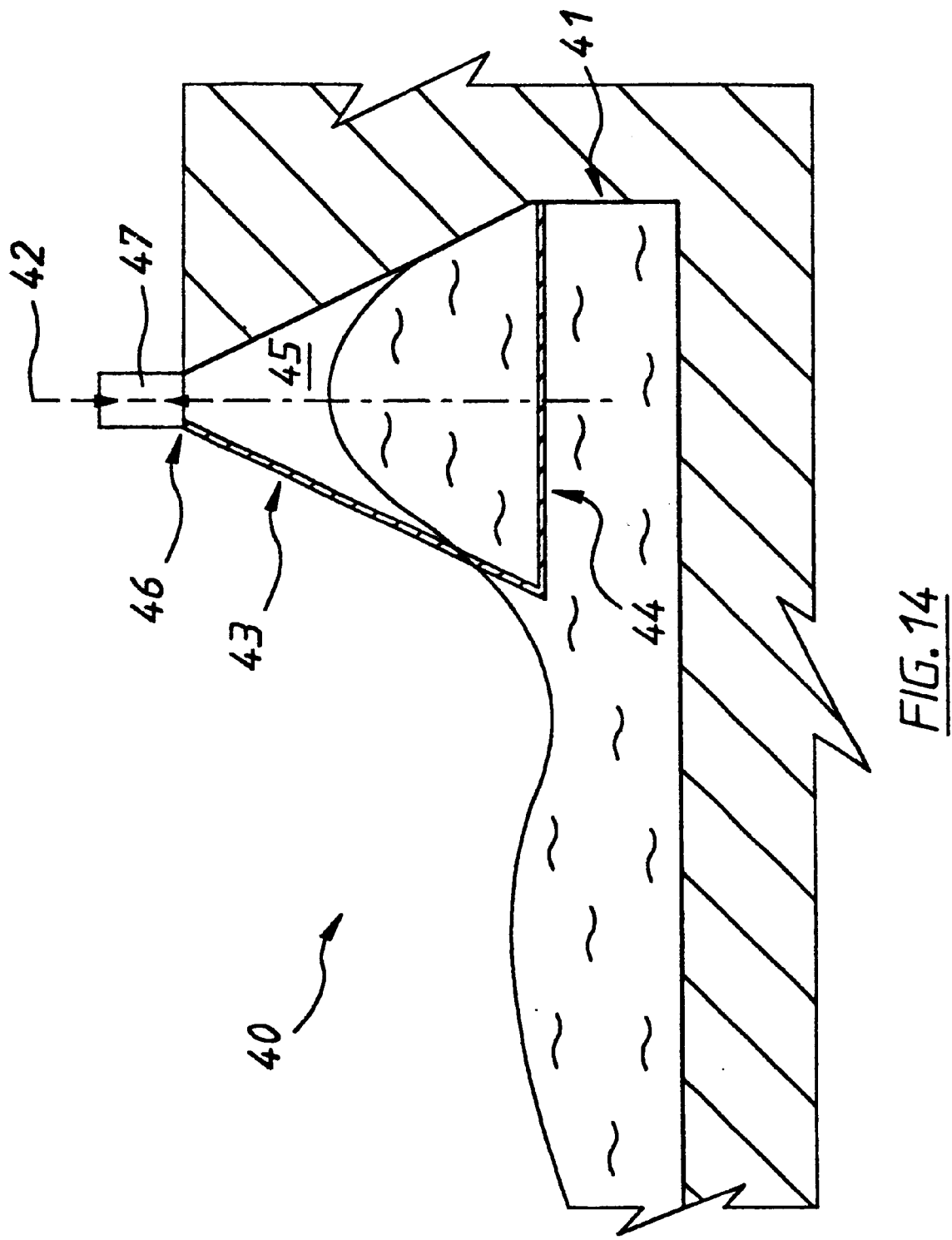
FIG. 14 is a schematic sectional view of a first embodiment ocean wave energy extracting device in accordance with the third aspect of the invention.

Moving next to FIG. 14, there is shown a schematic sectional view of a first embodiment ocean wave energy extracting system 40 in accordance with a third aspect of the invention.

The system 40 includes a wave focusing means shown generally at 41 which is used to magnify the periodic vertical peak to trough displacement of incoming waves at a predetermined plan location or harnessing region 12 the centre of which is indicated by line 42.

Disposed at or closely adjacent the plan location 42 circumscribing the harnessing region is an air compression chamber 43. The chamber has a generally submerged water inlet 44 and is sized such that on admission of the periodically oscillating waves a volume of air 45 is thereby displaced to generate a correspondingly periodic reversing air flow.

Desirably, the compression chamber converges toward an air outlet 46 in or adjacent which is located an air driven turbine shown generally at 47.

In use, the incoming waves are focused so as to magnify the periodic vertical peak to trough displacement of the waves adjacent the location 42. In this manner, a reciprocating body or column of water oscillates within the air compression chamber 43 via the water inlet 44, thereby acting like a piston on the volume of air 45 thereabove. For example, on the upward stroke of the wave, the volume of air 45 is displaced toward the air outlet 46, the converging chamber walls and ducting causing an acceleration of the displaced air flow. This accelerated air flow is then forced through the air driven turbine, the rotation of which may be used to power a generator or the like. As the waves subside air is drawn downwardly into the chamber, again causing rotation of the turbine which has been configured to operate unidirectionally in response to the reversing air flows.

In the preferred form, the system utilises the parabolic wave focusing device of the first aspect of the invention and the unidirectional turbine of the second aspect of the invention. In this manner, the exceptional efficiencies of each of these mechanisms is compounded to result in a highly viable wave energy extracting process.

However, as previously foreshadowed, it will be appreciated that each of the components of the system and in particular the wave focusing device and the turbine, can each be used in other applications or in combination with alternative devices not described herein in detail. This is particularly relevant to the turbine which may have numerous unrelated applications for use with a wide range of operating fluids.

In summary therefore it will be appreciated that whilst each aspect of the invention has been described with reference to specific embodiments, each of these various aspects and indeed the combined system incorporating these aspects, may be embodied in a variety of different forms and still fall within the scope of each aspect of the invention as claimed.

What is claimed is:

1. An ocean wave energy extracting system, said system comprising:

wave focusing means to magnify the periodic vertical peak to trough displacement of incoming waves at a predetermined plan location, wherein the wave focusing means comprises an open sided bay bounded by a generally upright wall, the wall being configured at its inner periphery to define in plan section from the bay opening two converging arms of generally part parabolic curvature, wherein the axes of symmetry of each of the paraboli from which the arms are derived are parallel and the arms are joined adjacent their converging ends to form a shared apex, the wall being oriented to admit an advancing wave front in a direction generally parallel to the axes of symmetry, so that upon reflection from the wall the wave converges to an energy harnessing region near the apex at or adjacent the focus of each of the paraboli, thereby amplifying the vertical displacement of the wave at that region;

an air compression chamber having a generally submerged water inlet disposed at or closely adjacent said predetermined plan location to admit the periodically oscillating waves so as to displace a volume of the air there above to thereby generate a correspondingly periodic reversing air flow;

the air compression chamber also having an air outlet; and an air driven turbine located in the air outlet and operable to rotate unidirectionally in response to the reversing air flow, the turbine operable to rotate unidirectionally when subjected to reversing generally axial fluid flow therethrough, the turbine including a rotor comprising:

a central hub; and a plurality of straight radially extending aerofoil sectioned blades each connected with the hub;

the cross-section of each of the blades being approximately symmetrical about a line defining the maximum camber height and generally constant along its radially extending length;

wherein the approximately symmetrical shape of the blades and their orientation in relation to the hub facilitates unidirectional rotation of the rotor in response to reversing axial fluid flows therethrough.

2. An ocean wave energy extracting system as claimed in claim 1, wherein the converging arms of part parabolic curvature are joined at the shared apex by means of an end wall portion that also defines the rear wall portion of an associated air compression chamber.

3. An ocean wave energy extracting system as claimed in claim 2, wherein the front wall portion of the associated air compression chamber is defined by a wall section that extends forward of the rear wall portion to circumscribe a predetermined area around the energy harnessing region, the front wall section extending only partially below an anticipated lowest wave level so that the water forming the wave is able to flow below the front wall and up into the chamber.

4. An ocean wave energy extracting system as claimed in claim 2, wherein the bay is defined by two relatively short arms of part parabolic curvature extending from the walls of an air compression chamber that is comparatively large in plan section at the level of entry of the wave.

5. An ocean wave energy extracting system as claimed in claim 2, wherein only a portion of the rear wall of the air compression chamber is formed by the existing coastline.

6. An ocean wave energy extracting system as claimed in claim 1, wherein the wall defined by the converging arms of part parabolic curvature and shared apex in combination define an end portion of a continuous single parabola or close approximation thereto, wherein upon reflection from the wall the waves converge in a region at or adjacent the single focus of that parabola.

7. An ocean wave energy extracting system as claimed in claim 1, wherein the bay is further bounded at its base by a generally planar sea bed that is of constant depth along a direction generally perpendicular to the axis or axes of symmetry of each parabola from which the part parabolic arms are derived.

8. An ocean wave energy extracting system as claimed in claim 7, wherein the sea bed slopes upwardly toward the energy harnessing region.

9. An ocean wave energy extracting system as claimed in claim 7, wherein the sea bed is generally horizontal within a majority of the bay area.

10. An ocean wave energy extracting system as claimed in claim 1, wherein the focal length of each parabola is less than or equal to $1/7$ of a wave length of the anticipated incoming waves.

11. An ocean wave energy extracting system as claimed in claim 1, wherein the focal length of each parabola is between 5 and 15 meters.

12. An ocean wave energy extracting system according to claim 1, wherein the air compression chamber is configured to converge from the water inlet toward the air outlet so as to accelerate the air flow.

13. An ocean wave energy extracting system according to claim 1, wherein the chamber includes a venturi adjacent its outlet in the throat of which is disposed the air driven turbine.

14. An ocean wave energy extracting system according to claim 1, wherein the air compression chamber outlet and/or shrouding associated with the turbine includes guide vanes to optimize the direction of air flow into and/or out of the turbine.

* * * * *

UNITED STATES PATENT AND TRADEMARK OFFICE
CERTIFICATE OF CORRECTION

PATENT NO. : 6,622,483 B2
DATED : September 23, 2003
INVENTOR(S) : Tom Denniss

It is certified that error appears in the above-identified patent and that said Letters Patent is hereby corrected as shown below:

<u>Title page, Item [54] and Column 1, lines 1-2,</u>
Title, please delete "OCEAN WAVE ENERGY EXTRACTION SYSTEM AND COMPONENTS THEREOF" and insert -- AN OCEAN WAVE ENERGY EXTRACTION SYSTEM AND COMPONENTS THEREOF --.

Signed and Sealed this

Twenty-seventh Day of January, 2004

JON W. DUDAS
*Acting Director of the United States Patent and Trademark Office*